United States Patent
Morton

(10) Patent No.: US 9,428,206 B1
(45) Date of Patent: Aug. 30, 2016

(54) DROPSTEP FOR BALL CART

(71) Applicant: Tachikara USA, Inc., Sparks, NV (US)

(72) Inventor: Christopher Morton, Leawood, KS (US)

(73) Assignee: TACHIKARA U.S.A., INC., Sparks, NV (US)

( * ) Notice: Subject to any disclaimer, the term of this patent is extended or adjusted under 35 U.S.C. 154(b) by 0 days.

(21) Appl. No.: 15/092,517

(22) Filed: Apr. 6, 2016

Related U.S. Application Data

(60) Provisional application No. 62/145,408, filed on Apr. 9, 2015.

(51) Int. Cl.
*B62B 1/00* (2006.01)
*B62B 5/00* (2006.01)
*B62B 3/10* (2006.01)
*B62B 3/02* (2006.01)
*B62B 3/12* (2006.01)

(52) U.S. Cl.
CPC . *B62B 5/00* (2013.01); *B62B 3/022* (2013.01); *B62B 3/104* (2013.01); *B62B 3/12* (2013.01)

(58) Field of Classification Search
CPC .............. B62B 1/04; B62B 1/14; B62B 1/16; B62B 1/26; B62B 1/264; B62B 2202/12; B62B 2202/48
See application file for complete search history.

(56) References Cited

U.S. PATENT DOCUMENTS 3,633,932 A * 1/1972 Holden .................. B62B 3/106
220/9.3

\* cited by examiner

*Primary Examiner* — John Walters
*Assistant Examiner* — James Triggs
(74) *Attorney, Agent, or Firm* — Baker & Hostetler LLP

(57) ABSTRACT

A ball cart for holding sporting equipment is disclosed. The cart may be capable of opening for use and closing into a shape that is more convenient for storage and transportation purposes. The cart consists of multiple folding parts and a dropstep pedal to efficiently collapse a sporting equipment cart. First springs bias the cart toward an open position. Second springs bias a handle that releases the cart from a closed position and allows the bias of the first springs to open the cart. The dropstep may be operated with a user's foot and does not require the use of hands.

24 Claims, 9 Drawing Sheets

DROPSTEP FOR BALL CART

CROSS REFERENCE TO RELATED APPLICATIONS

This application claims benefit under 35 U.S.C. §119(e) of Provisional U.S. Patent Application No. 62/145,408, filed Apr. 9, 2015, the contents of which is incorporated herein by reference in its entirety.

BACKGROUND

When a volleyball coach is adding or removing balls from a typical ball cart, the coach usually has their hands full. This makes it difficult for the coach to also open/close the ball cart and get it ready for placement within a carrying bag for transporting. A need therefore exists for a more efficient way of opening/closing sporting equipment so as to meet the increasing demand for ease-of-use sporting equipment to address the actual and perceived needs of each sporting coach and player.

More specifically, a significant amount of energy and activity is devoted to cleaning up and storing away sporting equipment after each individual lesson or sporting practice. Given this, there exists a continued need for solutions that can expedite and ease of utilizing carts that carry sporting equipment generally and for volleyball carts in particular.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect, there is provided a ball cart with a support frame. The support frame may comprise at least three vertical support posts, where a first diagonal member is positioned between a first vertical support post among the at least three vertical support posts and a second vertical support post among the at least three vertical support posts. And a second diagonal member is positioned between the first vertical support post and a third vertical support post among the at least three vertical support posts. The ball cart further comprises a dropstep pedal that includes a movable member, at least one spring, a handle, and a pedal. The movable member is movably mounted at least partially around the first vertical support post. Moreover, the movable member is configured to move along a length of the first vertical support post, and the handle is mounted to a support structure and biased toward the first vertical support post. The spring is affixed at one end to the handle and at a second end to the support structure and biased toward the handle. The pedal is affixed to the support structure and configured to transfer downward pressure applied to the pedal to the support structure such that a first end of the first diagonal member and a first end of the second diagonal member are pivotally affixed to the movable member.

Furthermore, according to the first aspect, a second end of the first diagonal member is pivotally affixed to or near a first end of the second vertical support post and a second end of the second diagonal member is pivotally affixed to or near a first end of the third vertical support post. The handle holds the support frame in a collapsed/closed position until released from the bias applied to the first vertical support post, at which point the bias of the spring causes the movable member to move up along the first vertical support post and to apply pushing pressure on the first diagonal member and the second diagonal member so as to cause the support frame to expand/open. And pressure is applied to the pedal to cause the movable member to move down along the first vertical support post and to apply pulling pressure on the first diagonal member and the second diagonal member so as to cause the support frame to collapse/close.

According to a second aspect, there is provided a ball cart with a support frame. The support frame includes at least three vertical support posts, a first diagonal member positioned between a first vertical support post among the at least three vertical support posts and a second vertical support post among the at least three vertical support posts, and a second diagonal member position between the first vertical support post and a third vertical support post among the at least three vertical support posts.

Furthermore, according to a second aspect, the ball cart comprises a dropstep pedal including a movable member, at least one spring, a handle, and a pedal. The movable member is movably mounted at least partially around the first vertical support post. The movable member is configured to move along a length of the first vertical support post. The handle is mounted to a support structure and biased toward the first vertical support post. The spring is affixed at one end to the handle and at a second end to the support structure and biased toward the handle. And the pedal is affixed to the support structure and configured to transfer downward pressure applied to the pedal to the support structure.

According to the second aspect, a first end of the first diagonal member is pivotally affixed to the movable member and a second end of the first diagonal member is pivotally affixed to a first end of the second vertical support post. A first end of the second diagonal member is pivotally affixed to first end of the first vertical support post and a second end of the second diagonal member is pivotally affixed to a second movable member mounted at least partially around the third vertical support post. And the handle holds the support frame in a collapsed/closed position until released from the bias applied to the first vertical support post, at which point the bias of the spring causes the support structure to move up along the first vertical support post and to apply pushing pressure on the first diagonal member and the second diagonal member so as to cause the support frame to expand/open. Moreover, pressure applied to the pedal causes the support structure to move down along the first vertical support post and to apply pulling pressure on the first diagonal member and the second diagonal member so as to cause the support frame to collapse/close.

BRIEF DESCRIPTION OF THE DRAWINGS

The foregoing Summary and the following Detailed Description are better understood when read in conjunction with the appended drawings. In order to illustrate the present disclosure, various aspects of the disclosure are shown. However, the disclosure is not limited to the specific aspects discussed. The following figures are included.

DETAILED DESCRIPTION OF ILLUSTRATIVE EMBODIMENTS

A sporting equipment cart may also be referred to as a premium ball cart, ball cart, or a volleyball cart. One embodiment of the cart is to hold or contain volleyballs. In alternate embodiments, the cart may be configured to hold other types of sporting equipment or sporting balls where multiple balls are used when playing or practicing the sport, such as baseball, softball and tennis. In one non-limiting example, the ball cart is supported by shafts, vertical members, or vertical support posts to form a structure that stands upright and is covered with a material sufficient to configure the cart for containing volleyballs or other types of balls. At least three or more vertical support posts are used herein. Furthermore, at least one diagonal member of an adjustable length affixed across each of two vertical support posts is used herein. The at least one diagonal member would be attached to a first vertical support post at one end and further attached to a second vertical support post at another end. There are a number of variations possible as to the manner in which the diagonal members are attached to the vertical support posts. The attachment between the diagonal member and the support posts may be screwed, hinged, or coupled together, etc., as long as the ends of the diagonal member can pivot relative to the vertical support post. The at least one diagonal member is attached to a movable member or a movable support structure that is further attached to a vertical support post. The movable member is configured to move or slide along any one of the three or more vertical posts in an upward or downward direction. The at least one diagonal member is configured to be collapsible. The main structure of the ball cart may be referred to as the support frame or aluminum frame. Other materials or types of metal may be used besides aluminum for the ball cart.

Figure 1:
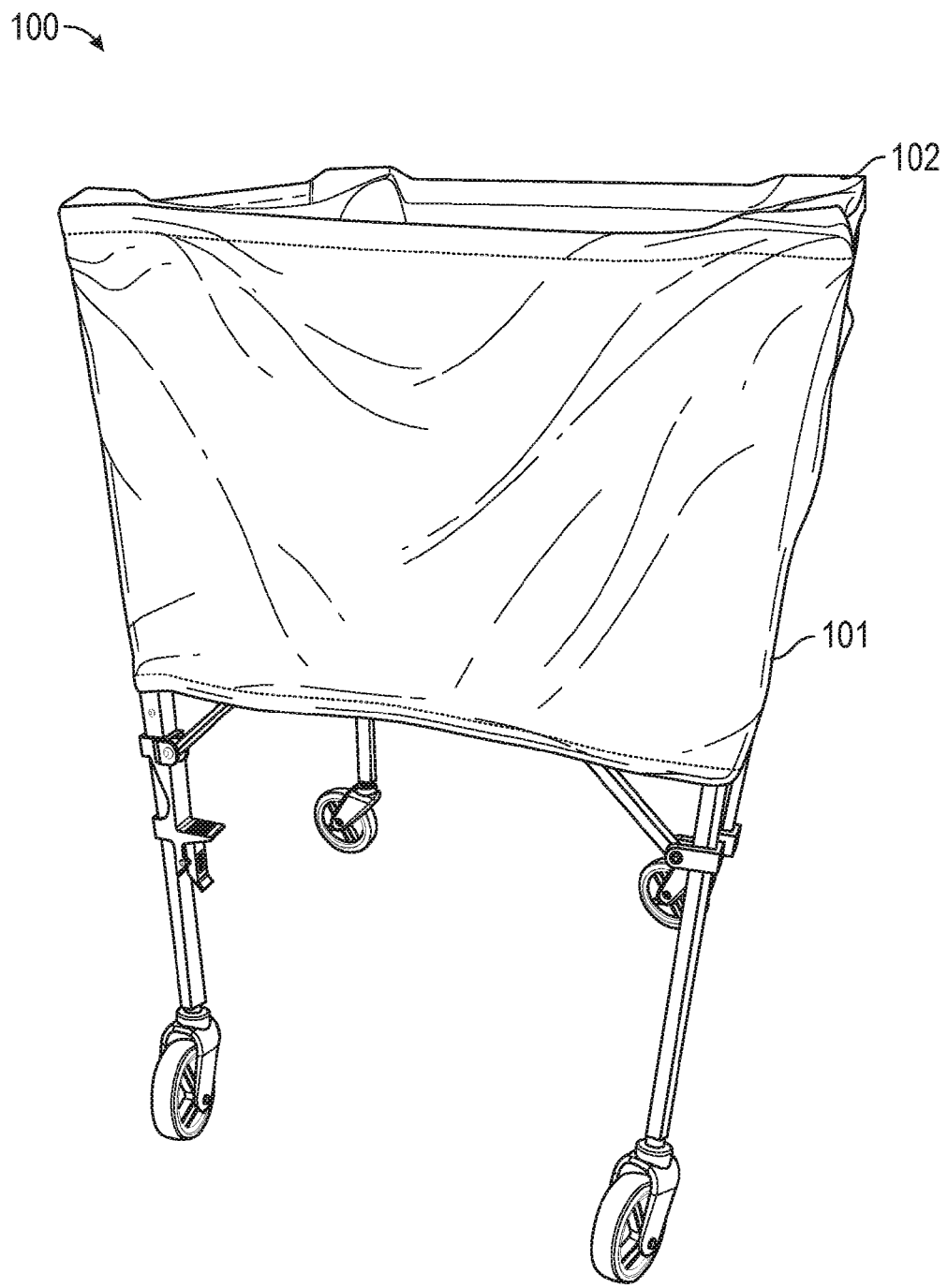
FIG. 1 is a perspective view of a ball cart with a dropstep pedal, according to one embodiment.

Referring now to FIG. 1, a ball cart 100 suitable for holding or containing sporting balls, volleyballs, or the like is illustrated. The ball cart 100 includes a support frame with at least three or more vertical support posts. In one exemplary embodiment, as shown in FIG. 1, the ball cart 100 has four vertical support posts. The ball cart 100 further includes at least one dropstep pedal including a support structure mounted onto one of the at least three vertical support posts. The at least three vertical support posts are further configured to be affixed or attached to at least one or more wheels. In the exemplary embodiment, as shown in FIG. 1, the ball cart 100 is attached to four wheels. The four wheels are configured to slide, glide across various types of surfaces, or transport the ball cart from one location to another, unless one or more of the wheels is locked, as further described below.

Further referring the FIG. 1, the ball cart 100 may be equipped with a piece of fabric, cloth, or sporting bag 101 that fits over the top of or otherwise surrounds at least the inside of the support frame of the ball cart 100. The cloth 101 may be used herein to hold the volleyballs, but can be used to hold other objects. Other types of materials and fabric may also be used herein to perform similar functions. For example, nylon material or a standard black cloth cover may be used for holding objects. The cloth 101 may contain attachable members or ends 102 that may be coupled, hinged, or affixed to the vertical support posts of the ball cart 100. The cloth cover may be detached from the supporting posts and in turn be used as a carrying bag for volleyballs. In other words, a carriage bag 101 is assembled on the ball cart 100, but is configured to be detached from the ball cart 100 and to be used to separately carry the volleyballs. The carriage bag 101 may be configured with at least one pocket (not shown) on at least one side and at least a one piece strap (not shown).

Figure 2A:
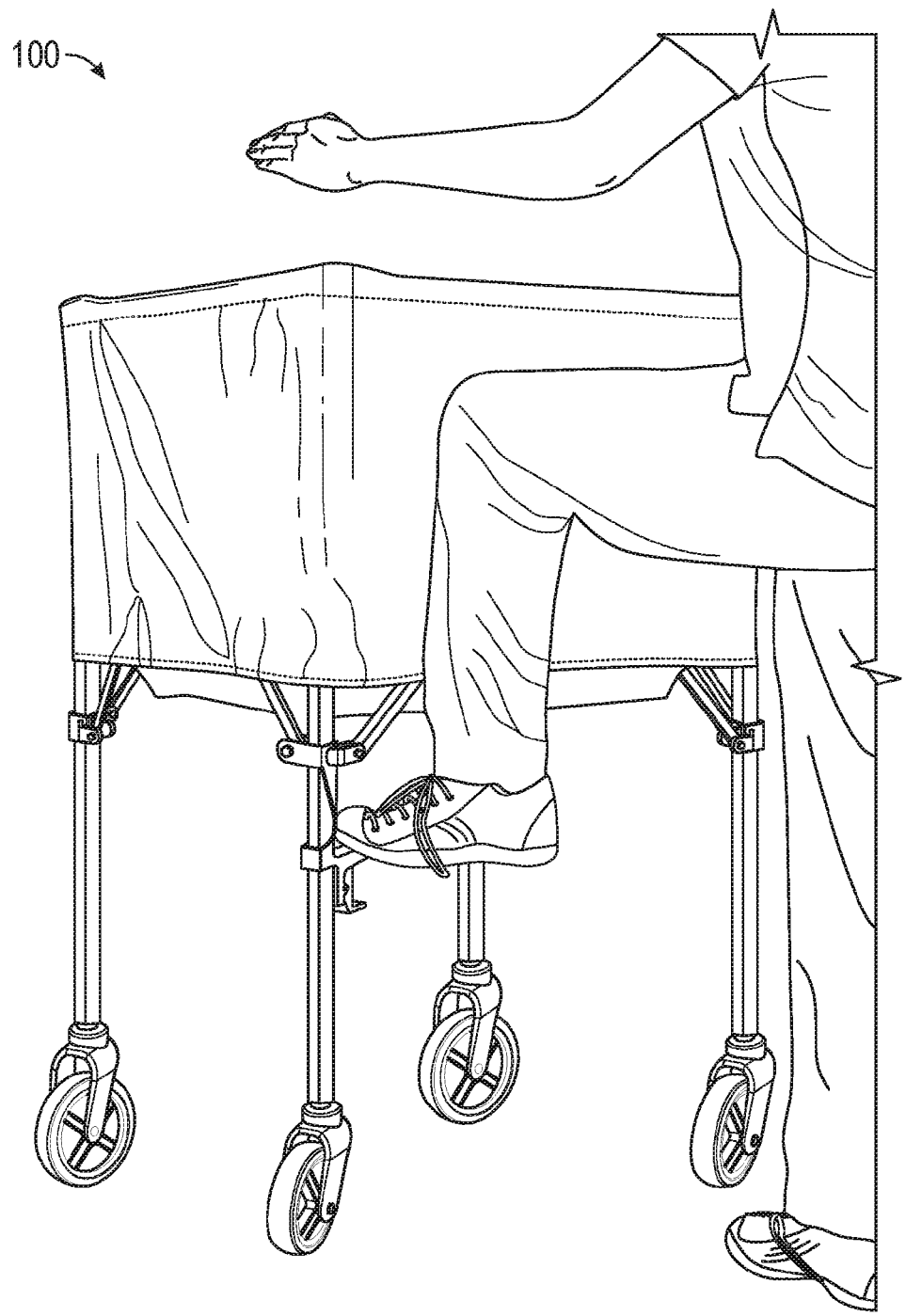
FIGS. 2A and 2B show a perspective view of an open or expanded ball cart and a perspective view of a closed or collapsed ball cart.

FIG. 2A illustrates a perspective view of an open ball cart 100. The ball cart 100 is configured to collapse/close without use of the user's hands, i.e., hands-free, by applying pressure on the dropstep pedal with the user's foot and pressing down. The pressure may be applied via a user's foot or another object. In another embodiment, the dropstep pedal may be pressed by a user's hand to collapse the cart. In yet another embodiment, the dropstep pedal may be pressed through any force that causes a downward pressure to collapse the cart. In the exemplary embodiment, the pressure applied via a user's foot eliminates the need for a user to use their hands to collapse/close the ball cart 100. Put another way, the ball cart 100 is configured to be closed or collapsed hands-free.

Figure 4:
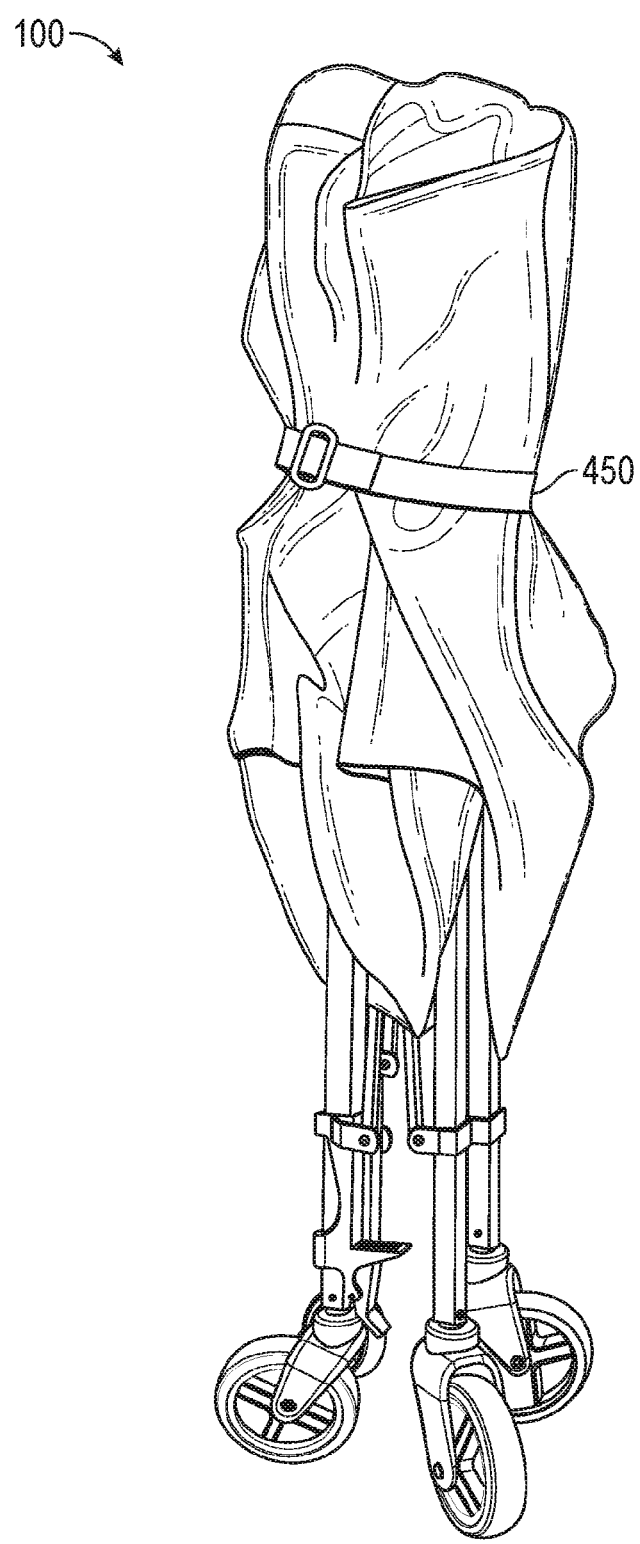
FIG. 4 illustrates a perspective view of the collapsed ball cart.

In one non-limiting example, a user could fill the cloth or sporting bag with balls and then remove the sporting bag from the ball cart 100, then step on the foot pedal of the dropstep pedal with a foot to collapse the ball cart 100 without any need for the user to set down the sporting bag first. Once pressed down, the entire structure of the ball cart 100 may be collapsed into a single elongated or rectangular shaped piece of equipment, as shown in FIG. 4, for ease of storage and transportation. The ball cart 100 may also be collapsed or closed while still covered with the cloth or bag as well, as shown in FIG. 2B.

Further referring to FIG. 2A, in the cart's open position, a user would apply force on the dropstep pedal, such as by stepping on the foot pedal, causing the movable support structure to move down along the length of the vertical support post until the pin of the handle entered a hole (not shown in FIG. 2A) among a series or line of holes in the vertical support post. Further pressure on the foot pedal would cause the pin to release from the hole until the next hole down in the line was entered. This process could be continued, essentially in one fluid motion, until the desired hole for the pin had been found. Alternatively, the vertical support post may include only a single hole. When downward pressure is applied to the foot pedal, retracting pressure would be applied to the diagonal support members, thereby drawing the vertical support posts toward one another and causing the cart to close or collapse. In an embodiment, the movable member simply slides up and down the vertical support post as the ball cart 100 is opened and closed, respectively, but could be configured to move in other ways, such along a geared track, via wires or ropes, or any of a number of other ways.

Figure 2B:
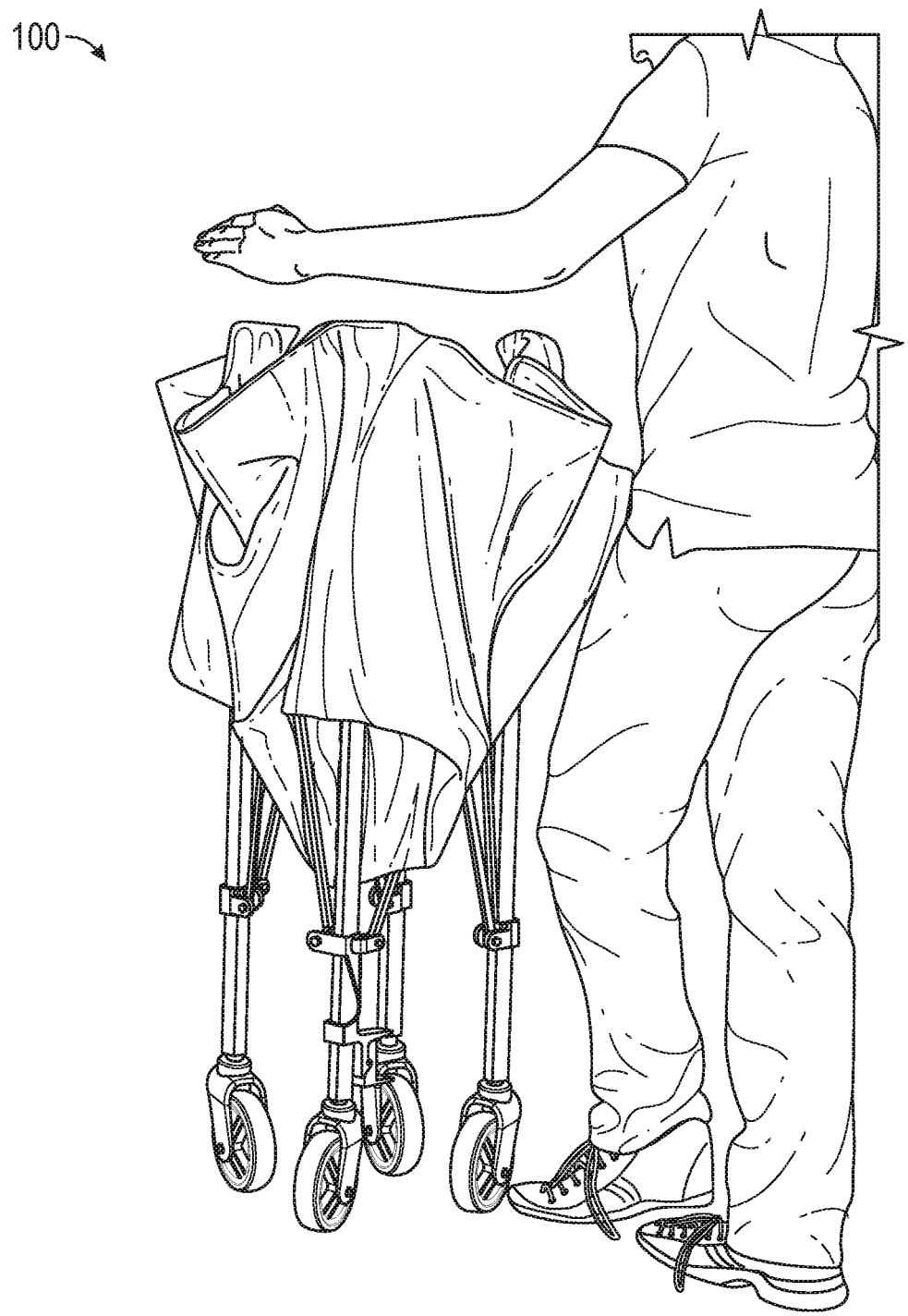

FIG. 2B illustrates a perspective view of the ball cart 100 after it has been collapsed by a user's foot. The dropstep pedal located on the vertical support post is configured to slide down the vertical support post such that the diagonal members are pulled together and the support frame is collapsed/closed in one fluid motion. Once collapsed, the ball cart 100 may continue to be transported on the wheels that are attached at the bottom of each vertical support post. A piece strap may be configured to surround and constrain the ball cart 100 and the ball cart 100 may be conveniently stored away for future use. Even further, once the ball cart 100 is collapsed, the ball cart 100 may fit into a separate carrying bag for transporting purposes.

Figure 3:
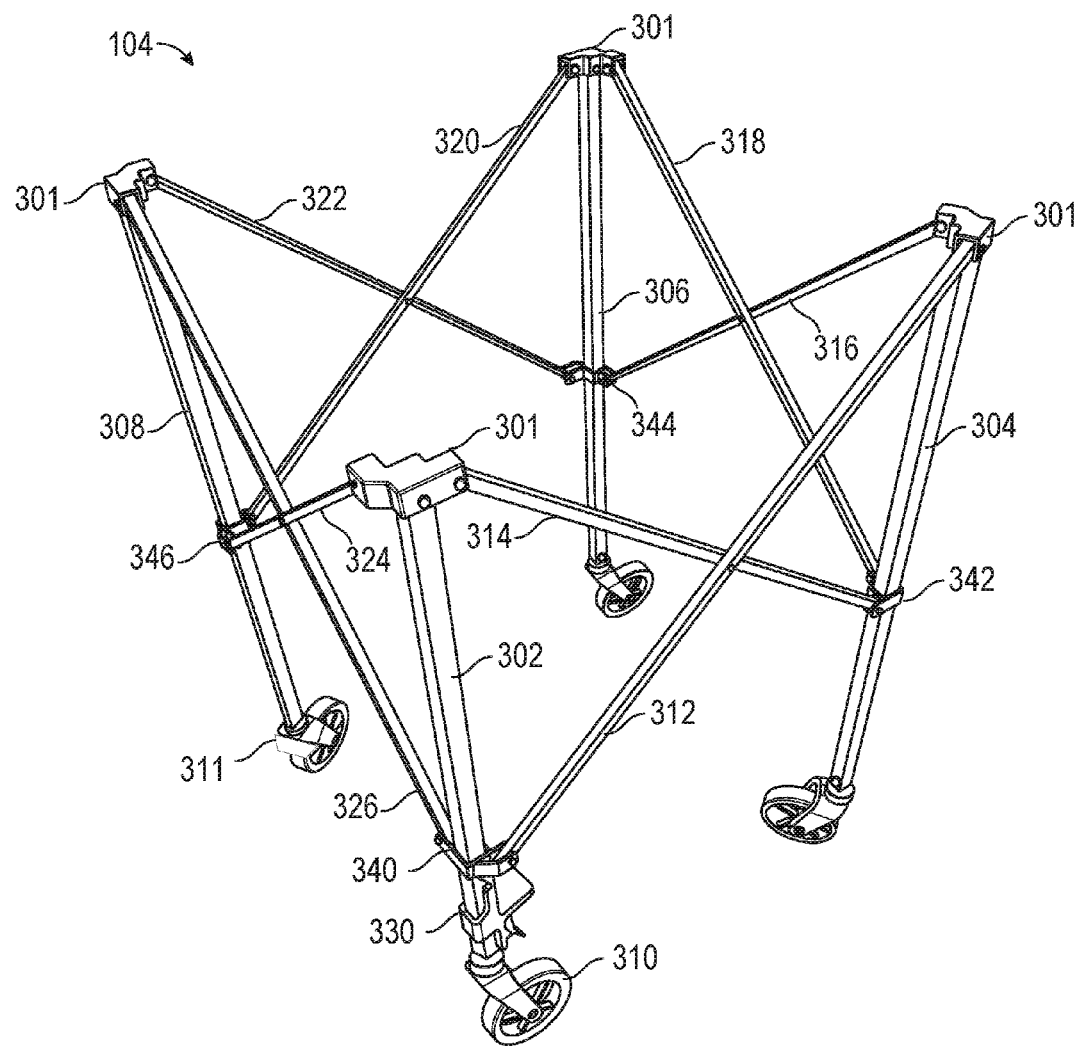
FIG. 3 is a perspective view of the open ball cart of FIG. 1 without a cloth cover.

Referring now to FIG. 3, the support frame 104 of the ball cart 100 (of FIGS. 1, 2A and 2B) is further illustrated, without a cloth or sporting bag cover. The support frame 104, in the exemplary embodiment and as shown in FIG. 3, includes at least three or four vertical support posts 302, 304, 306 and 308. Each of the four vertical support posts 302-308 are affixed or attached to wheels 310 that are configured to move or glide across various surfaces. As illustrated, one of the wheels 310 includes a locking mechanism 311 that is configured to lock the one wheel in place, but more than one wheel may include locking mechanism 311. This locking mechanism 311 is an optional embodiment. In other words, the locking mechanism 311 may create additional costs when manufacturing the ball cart 100 and therefore may not be a necessary addition to one of the wheels 310. Furthermore, the locking mechanism 311 may not be necessary even when the ball cart 100 is used hands-free by a user. FIG. 3 further illustrates the exemplary embodiment that includes four wheels 310. The support frame 104 further includes up to eight diagonal members 312, 314, 316, 318, 320, 322, 324 and 326, but the support frame could be formed of as little as two diagonal members, such as diagonal member 312 and 326, or 312 and 324.

As illustrated in FIG. 3, diagonal members 312 and 326 are configured to be pivotally affixed to a support structure of the dropstep pedal 330, which is further described below. Alternatively, diagonal members 312 and 326 are configured to be pivotally affixed to a movable member 340 that rests on top of the support structure of the dropstep pedal 330. While the first end of each diagonal member 312-326 is pivotally attached to a movable member, such as dropstep pedal 330 or movable members 340, 342, 344 and 346, the second end of each diagonal member 312-326 is pivotally attached to the first end the vertical support posts 302-308. As configured in this manner, as a movable member (the dropstep is also considered a movable member as it too is configured to move up and down a vertical support post) moves up or down a vertical support post, the connection point between the diagonal member and the movable member, as well as the connection point between the diagonal member and the first end of each vertical support post, pivots so as to accommodate the expansion and contraction of the support frame 104, For example, as the movable members move up, the support frame expands and as the movable members move down, the support frame contracts. FIG. 3 illustrates the support frame 104 between being expanded and contracted.

FIG. 4 illustrates a perspective view of the collapsed ball cart 100. The collapsed ball cart 100 may further be surrounded or tied together with an expandable piece strap (e.g., Velcro strap) 450 such that the ease of storage and transportation may be achieved. The piece strap 450 may prevent the support frame from inadvertently opening or expanding during transport from one location to another or opening when in storage.

Figure 5:
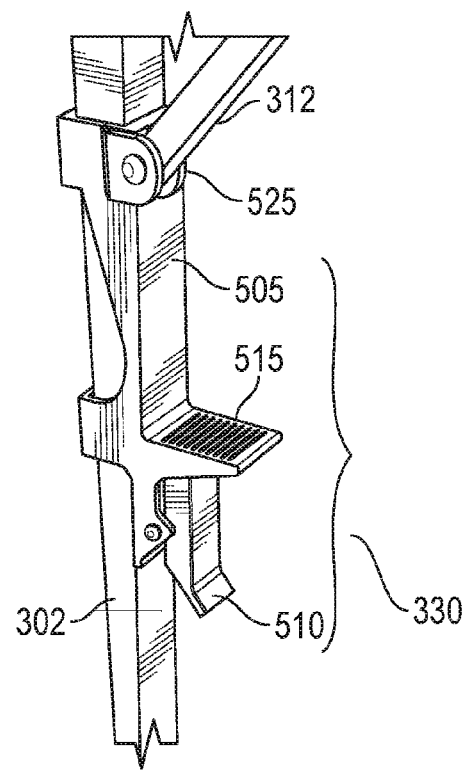
FIG. 5 shows a perspective view of the dropstep pedal attached to one of the vertical support posts of the ball cart.

FIG. 5 shows a more detailed perspective view of the dropstep pedal 330 of FIG. 3 attached to vertical support post 302 of ball cart 100. As depicted in FIG. 1, the ball cart 100 includes at least three or more vertical support posts. Therefore, the dropstep pedal 330 may be attached to at least one of: the first, second, or third, etc. vertical support posts. The dropstep pedal 330 includes a support structure 505 with at least one spring (not shown here, but depicted in FIG. 8), a handle 510, and a pedal 515. The support structure 505 is mounted at least partially around a vertical support post 302 having a bracket 525 toward an upper end and configured to move along a length of the vertical support post 302, the handle 510 being mounted to the support structure 505 and biased toward the vertical support post 302, the spring being affixed at one end to the bracket 525 and at a second end to the support structure 505 and biased toward the bracket 525, and the pedal 515 being affixed to the support structure 505 and configured to transfer downward pressure applied to the pedal 515 to the support structure 505. The support structure 505 may also be referred to as a movable member, a sliding support member or a sliding support structure 505.

Figure 6:
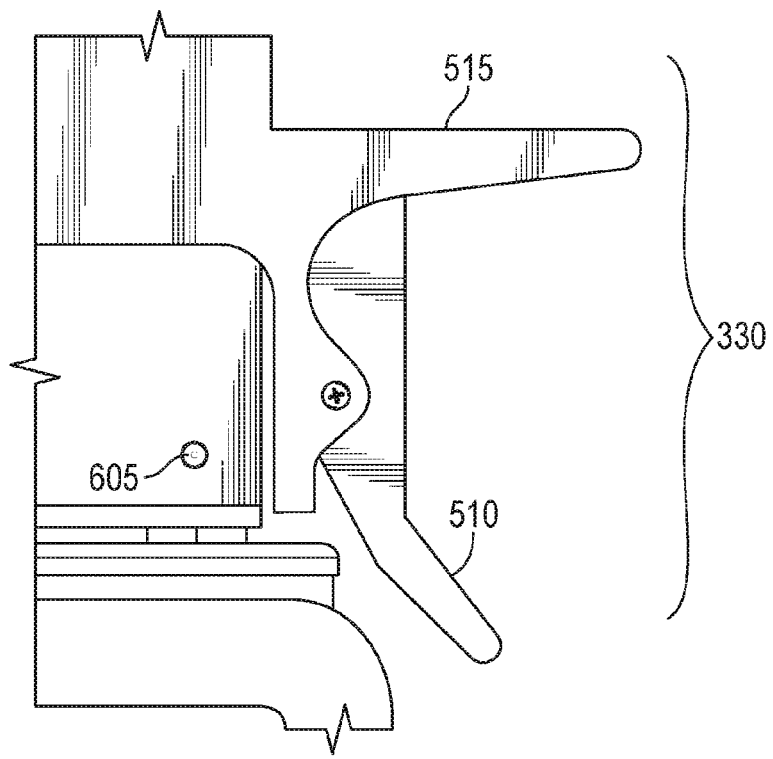
FIG. 6 illustrates a side view of the dropstep pedal attached to the vertical support post of the ball cart.

FIG. 6 further illustrates a side view of the dropstep pedal 330 as depicted in FIG. 5. The dropstep pedal 330 includes a foot pedal 515, a release mechanism, and a sliding support structure 505 that slides along a vertical support post 302 while pushing or pulling on diagonal support member 312, to put opening or closing pressure on all of the vertical support posts and diagonal members. In one non-limiting example and as indicated above, a user would apply force on the dropstep pedal 330, such as by stepping on the foot pedal 515, causing the sliding support structure 505 to slide down along the length of the vertical support post 302 until the pin 605 of the handle entered a hole (not shown) in the vertical support post 302. Further pressure on the foot pedal 515 would cause the pin 605 to release from the hole until the next hole down in a line of holes was entered. This process could be continued, essentially in one fluid motion, until the desired hole for the pin 605 had been found. Depending on the hole selected, the cart 100 could be fully open one-half open, one-third open, or fully closed. When downward pressure is applied to the foot pedal 515, retracting pressure would be applied to the diagonal support member 312, thereby drawing the vertical support posts 302 toward one another and causing the ball cart 100 to close or collapse.

The release mechanism includes cantilevered handle 510. The cantilevered handle 510 includes one or more springs (not shown here, but depicted in FIG. 8) or other biasing mechanism that bias the pin 605 toward the vertical support post 302. One or more additional springs or biasing members may also be connected on one end to a bracket at the top of the vertical support post 302 and on another end to the sliding support structure 505 so as to bias the sliding support structure 505 toward the upper portion of the vertical support post 302, thereby biasing the ball cart 100 toward an open position.

Furthermore, in FIG. 6, the dropstep pedal 330 may also be referred as a dropstep petal, a dropstep release petal, or simply a pedal. The dropstep pedal 330 may be attached, affixed, locked, hinged, or coupled to the sliding support structure 505 and configured to move up and down the vertical support post 302. Other configurations to attach the dropstep pedal 330 to the one or more vertical supporting posts may be used. All of or part of the dropstep pedal 330 may be black in color. The cantilevered handle 510 of the dropstep pedal 330 may be red in color or some other highlighting color or design for ease of recognition. However, in other embodiments, any color may be suitable for the dropstep pedal 330 and the cantilevered handle 510.

Figure 7:
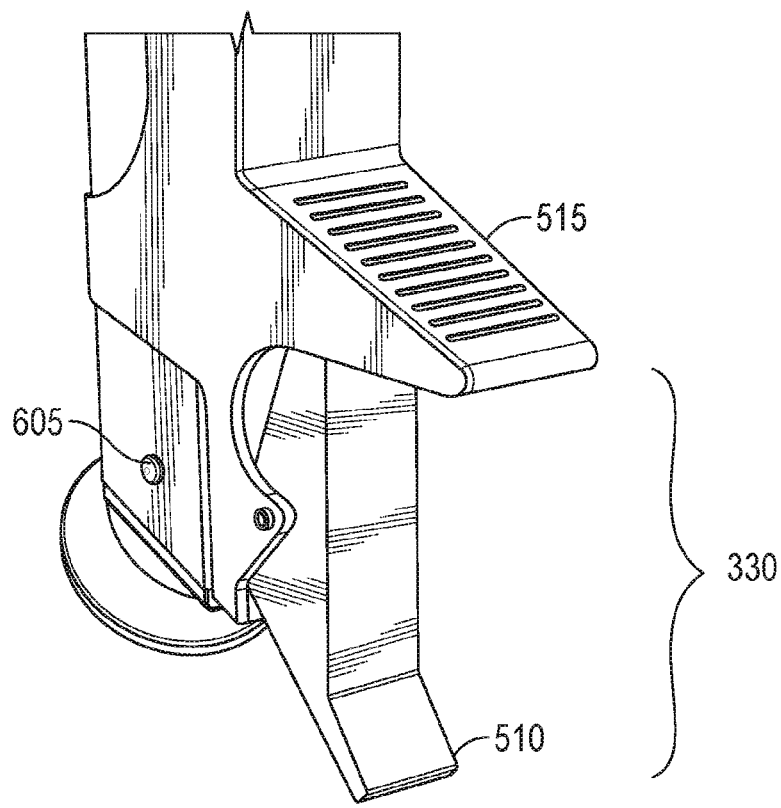
FIG. 7 shows a perspective view of a dropstep pedal with a cantilevered handle.

FIG. 7 illustrates a close-up view of the dropstep pedal 330 including the cantilevered handle 510. The dropstep pedal

330 may also include ridges (as illustrated) and/or an anti-slippery surface on the foot pedal 515. When a user's foot applies pressure on the foot pedal 515, the ridges and/or an anti-slippery surface may provide for a better grip on the foot pedal 515. This may prevent the user's foot from slipping off of the foot pedal 515 and causing the user to re-adjust and re-apply pressure multiple times.

The cantilevered handle 510 may also include a "RELEASE" label (not shown) on the handle 510 for ease of recognition. Other labels such as "PRESS HERE TO RELEASE," "OPEN," or the like may be applied to the handle 510 for further ease of recognition.

Figure 8:
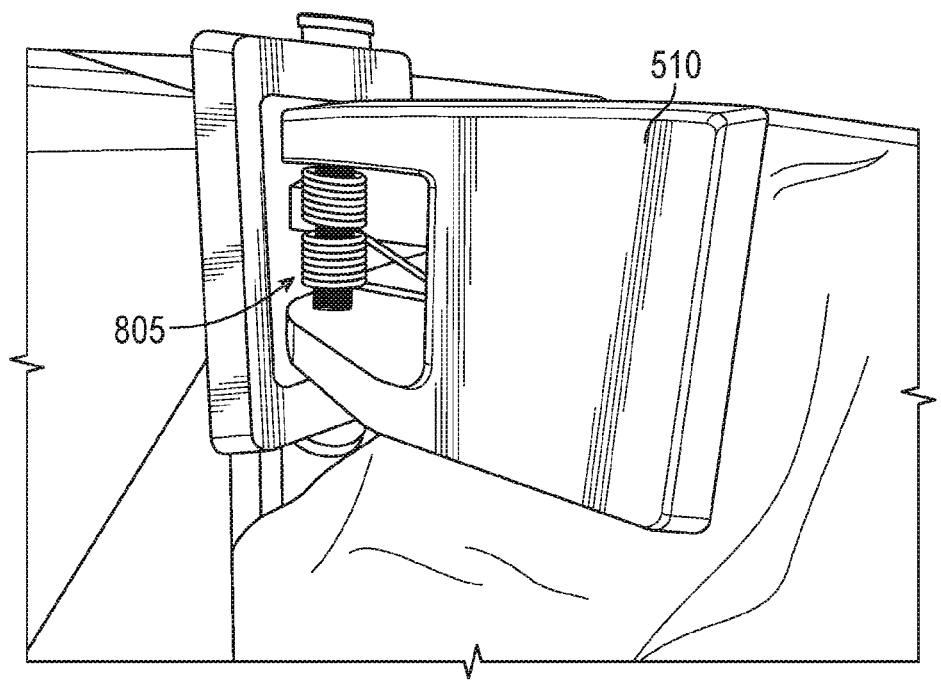
FIG. 8 illustrates a bottom view of the dropstep pedal including the one or more springs affixed to a bracket on the vertical support post.

FIG. 8 illustrates a bottom view of the dropstep pedal 330, as depicted in FIG. 5, including the cantilevered handle 510. In particular, FIG. 8 illustrates a close-up view of the one or more springs 805 located inside of the cantilevered handle 510. As described above in FIGS. 5-7, the cantilevered handle 510 includes one or more springs 805 that bias the pin 605 toward the vertical support post 302. One or more additional springs (not depicted here in FIG. 8) may be connected on one end to the bracket at the top of the vertical support post 302 and on another end to the sliding support structure 505 so as to bias the sliding support structure 505 toward the upper portion of the vertical support post 302, thereby biasing the ball cart 100 toward an open position. In one non-limiting example, the one or more springs 805 may be standard tension or extension springs. However, various types of other springs may be used in the handle 510.

Figure 9:
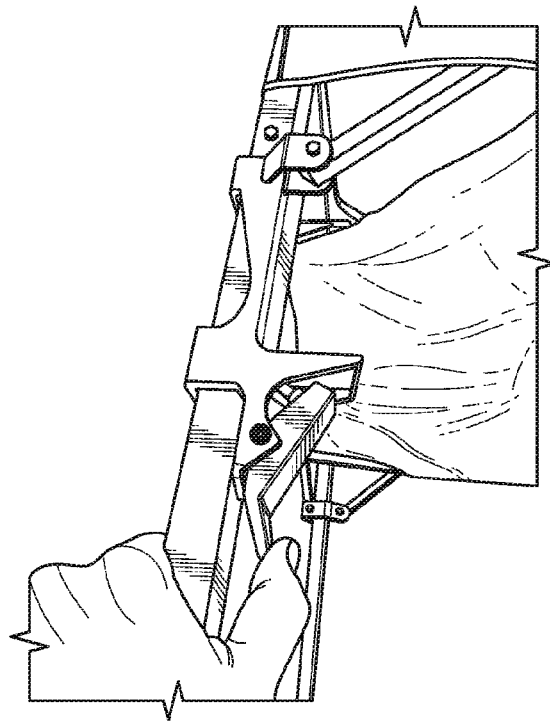
FIG. 9 shows a perspective view of a dropstep pedal with a cantilevered handle being pressed down by a user to generate a force that is applied to the springs through the cantilevered handle causing a handle pin to pull back from the support frame and further causing the ball cart of FIG. 4 to open.

Referring to FIG. 9, the ball cart 100 is illustrated in the closed position, and while in the closed position, the pin 605 of the handle is presently inserted in a hole of the vertical support post 302, preferably toward the bottom of the vertical support post 302 by the wheels. In this position, the one or more additional springs 805 connected to the sliding support structure 505 and the bracket at the top of the vertical support post 302 are stretched away from the springs' normal position, thereby applying pressure on the sliding support structure 505. If the cantilevered handle 510 is pressed with sufficient force, as depicted by a user's hands pressing down on the cantilevered handle 510 in FIG. 9, the one or more springs 805 within the handle may cause the pin 605 to release from the hole in the vertical support post 302, the one or more additional springs will contract toward the springs' normal position, thereby forcing the diagonal support members to put pressure on the other vertical support posts and cause the ball cart 100 to open without further assistance from a user. As further depicted in FIG. 9, the exemplary embodiment illustrates a user's thumb pressing down on the handle 510; however, other sources of pressure may be applied to the handle 510 to open the ball cart 100. In one non-limiting example, a user's foot may also be used to press down and cause pressure on the handle 510 to open the ball cart 100.

Figure 10:
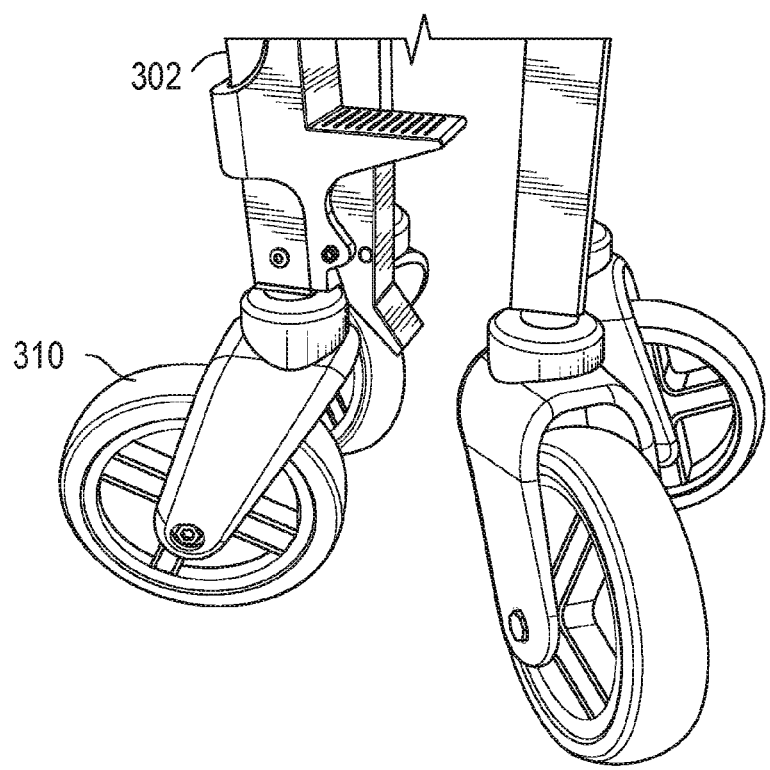
FIG. 10 is close-up view of the ball cart position above at least one or more locking wheels.

As illustrated in FIG. 10, the ball cart 100 is configured with one or more locking wheels 310 that extend from the bottom of the vertical support post 302 of the configuration. In the exemplary embodiment, the support post 302 is mounted onto a moveable support frame having one or more regular or locking wheels 310. The one or more wheels 310 may be suitable to roll on volleyball courts or any kind of surface. Each one of the wheels 310 includes a locking mechanism (shown in FIG. 3) that is configured to lock the wheel in place to prevent movement or inadvertent gliding down a surface. Any of a large number of different types of available locking mechanisms may be used. In one non-limiting alternative example, each one of the wheels 310 includes a separate foot pedal that is configured to receive pressure from a user such that the pedal is configured to contract the wheel to lock and prevent the wheel from moving. The one or more wheels 310 may be oversized wheels comprised of ethylene-vinyl acetate (EVA) foam. However, other materials and types of plastic besides EVA foam may also be used for the one or more wheels 310.

Figure 11:
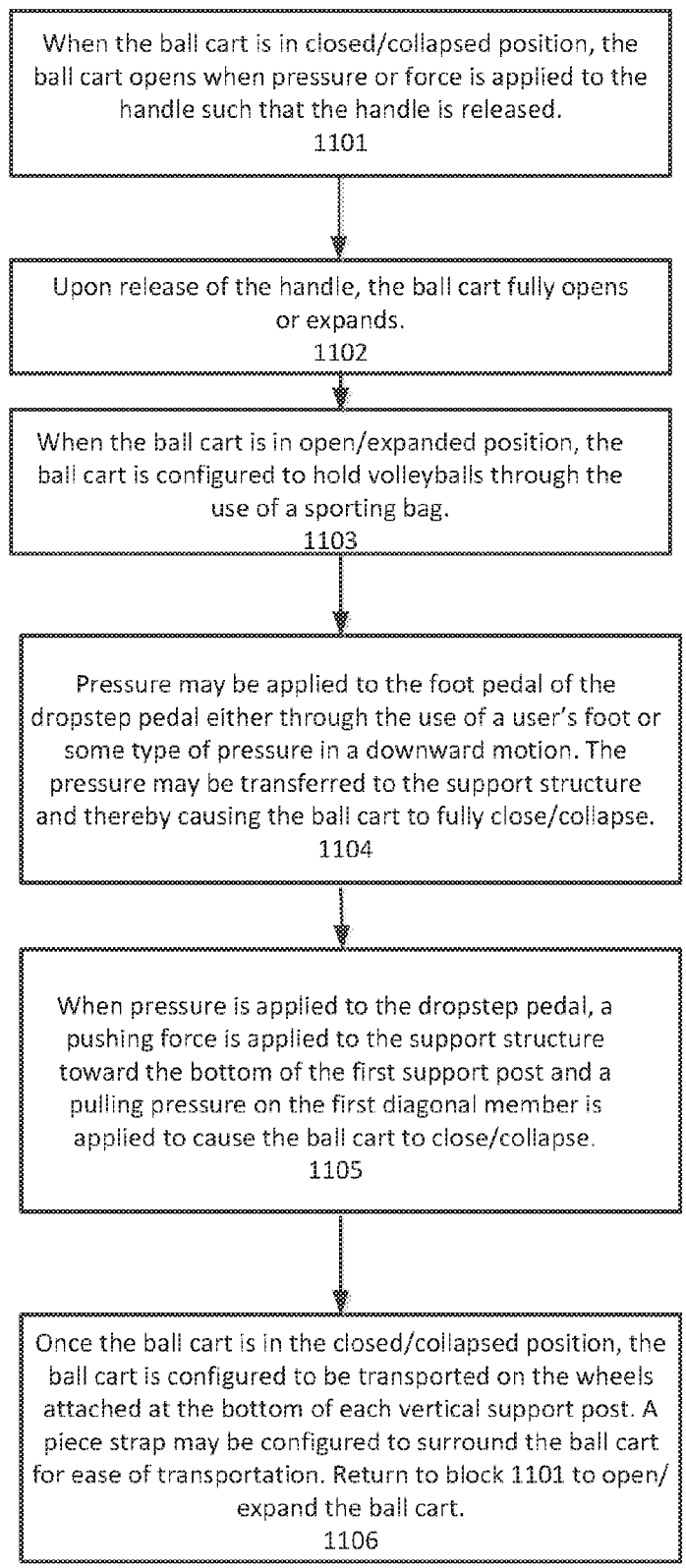
FIG. 11 illustrates a flowchart depicting the method of releasing the cantilevered handle to open/expand the ball cart and then applying pressure to the dropstep pedal to collapse/close the ball cart.

FIG. 11 illustrates a flowchart depicting the method of releasing the cantilevered handle to open/expand the ball cart and then applying pressure to the dropstep pedal to collapse/close the ball cart. Block 1101 depicts that the ball cart when in the collapsed or closed position is configured to open by releasing a cantilevered handle attached to a support structure. The handle is released when a user presses down on the handle. When the cantilevered handle is pressed with sufficient force, the one or more springs within the handle cause the pin to release from the hole in the vertical support post, the one or more additional springs will contract toward the springs' normal position, thereby forcing the diagonal support members to put pressure on the other vertical support posts and cause the ball cart to open without further assistance from a user.

In block 1102, upon release of the handle, the support structure is pulled toward the top of the first support post and a pushing pressure is applied to the first diagonal member causing the ball cart to fully open or expand.

Moreover, in block 1103, the ball cart is expanded or opened and configured to hold sporting balls. As described above, the ball cart is configured to hold volleyballs. The ball cart may be equipped with a piece of fabric, cloth, or sporting bag that fits or surrounds the inside of the support frame of the ball cart. The cloth may be used herein to hold the volleyballs. The cloth may contain attachable members or ends that may be coupled, hinged, or affixed to the vertical support posts of the ball cart. The cloth cover may be detached from the supporting posts and in turn be used as a carrying bag for volleyballs. Put another way, a standard carriage bag may be assembled on the ball cart, but may also be configured to be detached from the ball cart and to be used to separately carry the volleyballs.

Block 1104 describes applying pressure to the foot pedal of the dropstep pedal attached to the support structure. By applying pressure to the foot pedal in either the form of a user's foot or some type of pressure in a downward motion, pressure is transferred to the support structure and thereby causing the ball cart to fully close or collapse.

Block 1105 further depicts that the pressure applied to the dropstep pedal is transferred and further applied to the support structure, thereby pushing the support structure toward the bottom of the first support post and applying pulling pressure on the first diagonal member causing the ball cart to close or collapse. A bias may be applied by the handle to the first support post such that it keeps the ball cart in a closed or collapsed position until the handle is released.

Block 1106 depicts that the ball cart in the closed or collapsed position. Once collapsed, the ball cart may continue to be transported on the wheels that are attached at the bottom of each vertical support post. A piece strap may be configured to surround and constrain the ball cart and the ball cart may be conveniently stored away for future use. Even further, once the ball cart is collapsed, the ball cart may fit into a separate carrying bag for transporting purposes. By returning to block 1101, the method or process to open or expand the ball cart may be repeated.

Directional terms such as "top," "bottom," "upwards," "downwards," "vertically," and "laterally," are used in the following description for the purpose of providing relative reference only, and are not intended to suggest any limitations on how any article is to be positioned during use, or to be mounted in an assembly or relative to an environment. Additionally, the term "substantially" as used in this description is intended to describe a particular characteristic of a claimed element. Further, the term "couple" and variants of it such as "coupled", "couples", and "coupling" as used in this description are intended to include indirect and direct connections unless otherwise indicated. For example, if a first supporting post is coupled to a second supporting post, that coupling may be through a direct connection or an affixation.

It will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore, it is intended that the claims not be limited to the particular implementations disclosed herein.

What is claimed:

1. A ball cart for transporting and holding at least one ball, the ball cart comprising:
   a support frame, including at least three vertical support posts, a first diagonal member positioned between a first vertical support post among the at least three vertical support posts and a second vertical support post among the at least three vertical support posts, and a second diagonal member positioned between the first vertical support post and a third vertical support post among the at least three vertical support posts; and
   a dropstep pedal including a movable member, at least one spring, a handle, and a pedal, the movable member being movably mounted at least partially around the first vertical support post, the movable member being configured to move along a length of the first vertical support post, the handle being mounted to a support structure and biased toward the first vertical support post, the spring being affixed at one end to the handle and at a second end to the support structure and biased toward the handle, and the pedal being affixed to the support structure and configured to transfer downward pressure applied to the pedal to the support structure,
   wherein a first end of the first diagonal member and a first end of the second diagonal member are pivotally affixed to the movable member,
   wherein a second end of the first diagonal member is pivotally affixed to or near a first end of the second vertical support post and a second end of the second diagonal member is pivotally affixed to or near a first end of the third vertical support post,
   wherein the handle holds the support frame in a collapsed/closed position until released from the bias applied to the first vertical support post, at which point the bias of the spring causes the movable member to move up along the first vertical support post and to apply pushing pressure on the first diagonal member and the second diagonal member so as to cause the support frame to expand/open, and
   wherein pressure applied to the pedal causes the movable member to move down along the first vertical support post and to apply pulling pressure on the first diagonal member and the second diagonal member so as to cause the support frame to collapse/close.

2. The ball cart of claim 1, wherein the pressure applied to the pedal is pressure received from a hands-free user.

3. The ball cart of claim 1, wherein the support frame further includes four vertical support posts and at least two additional diagonal members, wherein a first additional diagonal member is configured to be positioned between the second vertical support post and a fourth vertical support post and a second additional diagonal member is configured to be positioned between the third vertical support post and the fourth vertical support post.

4. The ball cart of claim 3, wherein a first end of the first additional diagonal members is pivotally mounted to a second movable member mounted at least partially around one of the four vertical support posts other than the first vertical support post.

5. The ball cart of claim 1, further comprising at least three wheels mounted to a bottom of each vertical support post among the at least three vertical support posts.

6. The ball cart of claim 5, wherein at least one wheel among the at least three wheels further includes a locking mechanism that is configured to lock the one wheel in place.

7. The ball cart of claim 1, further comprising a bag or cloth configured to hold the at least one ball, the bag or cloth being configured to fit over a top of each vertical support post among the at least three vertical support posts.

8. The ball cart of claim 7, wherein the bag or cloth is further configured to be readily removed from the support frame and to transport the at least one ball.

9. The ball cart of claim 1, wherein the handle is further configured to be released based at least in part on a releasing mechanism, the releasing mechanism being configured to receive pressure from a user and release a pin that is interconnected with a hole of the first vertical support post.

10. The ball cart of claim 1, wherein the movable member is the support structure.

11. The ball cart of claim 1, wherein the movable member rests on top of the support structure.

12. The ball cart of claim 1, wherein the support frame includes a fourth vertical support post and at least six additional diagonal members, wherein a first end of the first additional diagonal member is pivotally affixed to a first end of the first vertical support post and a second end of the first additional diagonal member is pivotally affixed to a second movable member at least partially around the second vertical support post, wherein a first end of a second additional diagonal member is pivotally affixed to the second movable member and a second end of the second additional diagonal member is pivotally affixed to first end of the fourth vertical support post, wherein a third additional diagonal member is pivotally affixed to the first end of the second vertical support post and a second end of the third additional diagonal member is pivotally affixed to a third movable member at least partially around the fourth vertical support post, wherein a first end of the fourth additional diagonal member is pivotally affixed to the third movable member and a second end of the fourth additional diagonal member is pivotally affixed to the first end of the third vertical support post, wherein a first end of a fifth additional diagonal member is pivotally affixed to the first end of the fourth vertical support post and a second end of the fifth additional diagonal member is pivotally affixed to a fourth movable member at least partially around the third vertical support post, and wherein a first end of the sixth additional diagonal member is pivotally affixed to the fourth movable member and a second end of the sixth additional diagonal member is pivotally affixed to a first end of the first vertical support post.

13. A ball cart for transporting and holding at least one ball, the ball cart comprising:
    a support frame, including at least three vertical support posts, a first diagonal member positioned between a first vertical support post among the at least three vertical support posts and a second vertical support post among the at least three vertical support posts, and a second diagonal member positioned between the first vertical support post and a third vertical support post among the at least three vertical support posts; and a dropstep pedal including a movable member, at least one spring, a handle, and a pedal, the movable member being movably mounted at least partially around the first vertical support post, the movable member being configured to move along a length of the first vertical support post, the handle being mounted to a support structure and biased toward the first vertical support post, the spring being affixed at one end to the handle and at a second end to the support structure and biased toward the handle, and the pedal being affixed to the support structure and configured to transfer downward pressure applied to the pedal to the support structure; and wherein a first end of the first diagonal member is pivotally affixed to the movable member and a second end of the first diagonal member is pivotally affixed to a first end of the second vertical support post, wherein a first end of the second diagonal member is pivotally affixed to first end of the first vertical support post and a second end of the second diagonal member is pivotally affixed to a second movable member mounted at least partially around the third vertical support post, wherein the handle holds the support frame in a collapsed/closed position until released from the bias applied to the first vertical support post, at which point the bias of the spring causes the support structure to move up along the first vertical support post and to apply pushing pressure on the first diagonal member and the second diagonal member so as to cause the support frame to expand/open, and wherein pressure applied to the pedal causes the support structure to move down along the first vertical support post and to apply pulling pressure on the first diagonal member and the second diagonal member so as to cause the support frame to collapse/close.

14. The ball cart of claim 13, wherein the pressure applied to the pedal is pressure received from a hands-free user.

15. The ball cart of claim 13, wherein the support frame further includes four vertical support posts and at least two additional diagonal members, wherein a first additional diagonal member is configured to be positioned between the second vertical support post and a fourth vertical support post and a second additional diagonal member is configured to be positioned between the third vertical support post and the fourth vertical support post.

16. The ball cart of claim 15, wherein a first end of the first additional diagonal members is pivotally mounted to a second movable member movably mounted at least partially around either the second vertical support post or the fourth vertical support post.

17. The ball cart of claim 13, further comprising at least three wheels mounted to a bottom of each vertical support post among the at least three vertical support posts.

18. The ball cart of claim 17, wherein at least one wheel among the at least three wheels further includes a locking mechanism that is configured to lock the one wheel in place.

19. The ball cart of claim 13, further comprising a bag or cloth configured to hold the at least one ball, the bag or cloth being configured to fit over a top of each vertical support post among the at least three vertical support posts.

20. The ball cart of claim 19, wherein the bag or cloth is further configured to be readily removed from the support frame and to transport the at least one ball.

21. The ball cart of claim 13, wherein the handle is further configured to be released based at least in part on a releasing mechanism, the releasing mechanism being configured to receive pressure from a user and release a pin that is interconnected with a hole of the first vertical support post.

22. The ball cart of claim 13, wherein the support frame includes a fourth vertical support post and at least six additional diagonal members, wherein a first end of the first additional diagonal member is pivotally affixed to a first end of the first vertical support post and a second end of the first additional diagonal member is pivotally affixed to a third movable member at least partially around the second vertical support post, wherein a first end of a second additional diagonal member is pivotally affixed to the third movable member and a second end of the second additional diagonal member is pivotally affixed to first end of the fourth vertical support post, wherein a third additional diagonal member is pivotally affixed to the first end of the second vertical support post and a second end of the third additional diagonal member is pivotally affixed to a fourth movable member at least partially around the fourth vertical support post, wherein a first end of the fourth additional diagonal member is pivotally affixed to the fourth movable member and a second end of the fourth additional diagonal member is pivotally affixed to the first end of the third vertical support post, wherein a first end of a fifth additional diagonal member is pivotally affixed to the first end of the fourth vertical support post and a second end of the fifth additional diagonal member is pivotally affixed to the second movable member, and wherein a first end of the sixth additional diagonal member is pivotally affixed to the first end of the third vertical support post and a second end of the sixth additional diagonal member is pivotally affixed to movable member.

23. The ball cart of claim 13, wherein the movable member is the support structure.

24. The ball cart of claim 13, wherein the movable member rests on top of the support structure.

* * * * *